10-2-73 XR 3,762,800

United States Patent [19]

Olson et al.

[11] 3,762,800

[45] Oct. 2, 1973

[54] OPTICAL-TRANSFER BAND FOR READING EMBOSSED CHARACTERS

[75] Inventors: Gust A. Olson, Los Angeles; Doyle E. Wilcox, Hacienda, both of Calif.

[73] Assignee: North American Rockwell Corporation, El Segunda, Calif.

[22] Filed: Oct. 2, 1972

[21] Appl. No.: 294,402

[52] U.S. Cl. .............................. 350/160 R, 350/266
[51] Int. Cl. .............................................. G02f 1/30
[58] Field of Search ............................ 350/160, 266; 235/61.11 E; 250/219 DC, 219 DQ, 219 CR

[56] References Cited

UNITED STATES PATENTS 3,627,991 12/1971 Beall et al. ..................... 350/160 R

*Primary Examiner*—William L. Sikes
*Attorney*—L. Lee Humphries et al.

[57] ABSTRACT

An improved optical-transfer band for use in a system for reading embossed characters. The optical-transfer band is fitted over the periphery of an optical disc, the edges of the band grip the optical disc tightly to excluse dust and maintain the proper spacing between the band and the optical disc at all times.

4 Claims, 5 Drawing Figures

PATENTED OCT 2 1973 3,762,800

SHEET 2 OF 2

OPTICAL-TRANSFER BAND FOR READING EMBOSSED CHARACTERS

BACKGROUND OF THE INVENTION

1. Field of the Invention

This invention relates to an improved optical-transfer band and more particularly for use in a system for reading embossed characters.

2. Description of Prior Art

Reference is made to U.S. Pat. No. 3,627,991, entitled "Pattern Reader," by H. A. Beall, Jr., et al., and assigned to the common assignee. The "Pattern Reader" described in the cited patent is one of the few known systems utilizing an elastic film (optical-transfer band) for reading embossed characters. In the Beall patent, the transfer band is an elongated, continuous strip which is fitted over a portion of the periphery of an optical disc. The band is also fitted over a guide roller in a pulley-type arrangement. In this arrangement, the tension on the band is such that it will not stick to the disc surface after it has been pressed against the optical surface.

The arrangement shown in the cited patent is susceptable to entrapment of foreign matter, such as dust, between the band and the disc because the optical-transfer band is not continually fitted over the entire periphery of the optical disc. Optical readers will not function properly if the space between the optical disc and the optical-transfer band is contaminated with foreign matter because the scanning mechanism will detect the foreign matter if it accumulates to substantial size.

Furthermore, the abrasiveness of the foreign matter may permanently damage the surface of the disc thereby preventing internal reflection as discussed in the aforementioned Beall patent.

SUMMARY OF THE INVENTION

This invention relates to an optical-transfer band. The transfer band is fitted over the periphery of an optical disc. Protrusions on the transfer band engage matching grooves on the optical disc. The edges of the transfer band grip the optical disc tightly to exclude foreign matter from the periphery of the optical disc and to maintain the proper spacing between the band and the optical disc.

DESCRIPTION OF THE PREFERRED EMBODIMENT

Figure 2:
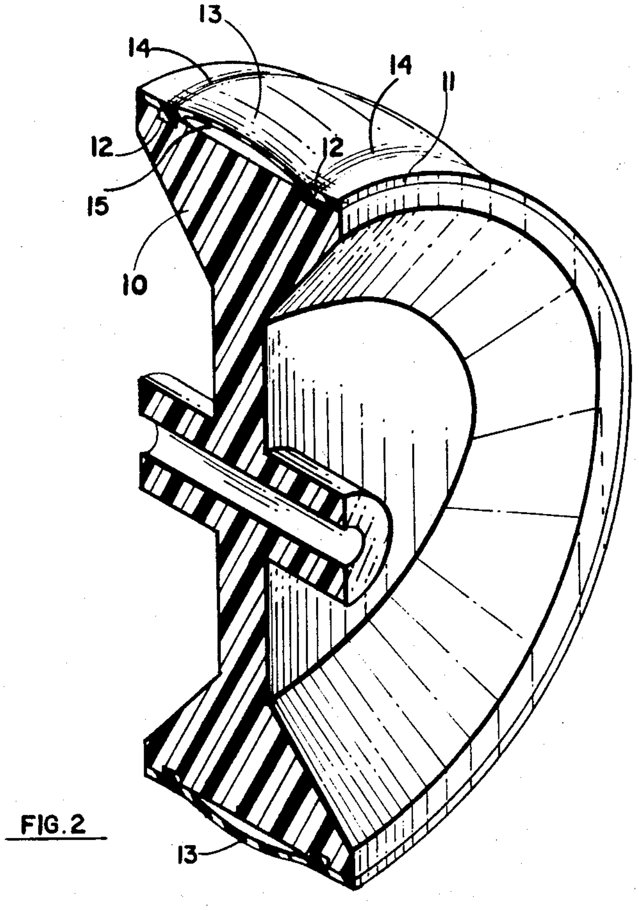
FIG. 2 is a perspective view of a portion of the embodiment shown in FIG. 1.

In the following description, the same reference numeral is used in conjunction with similar components in each of the drawings.

Figure 1:
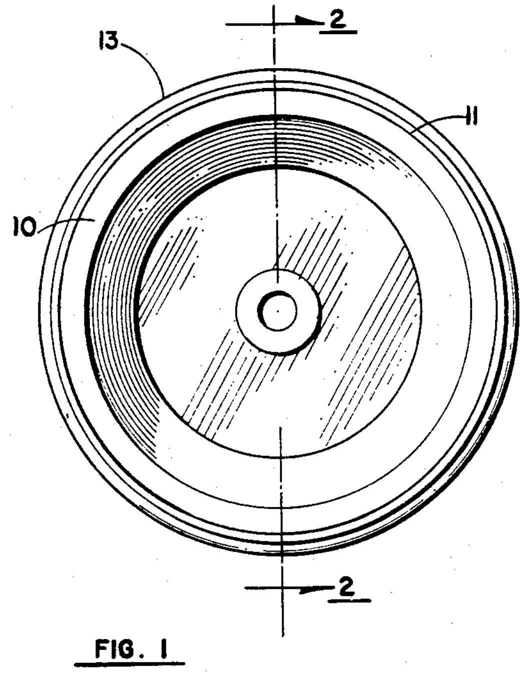
FIG. 1 is a side view of one embodiment of the invention.
Figure 3:
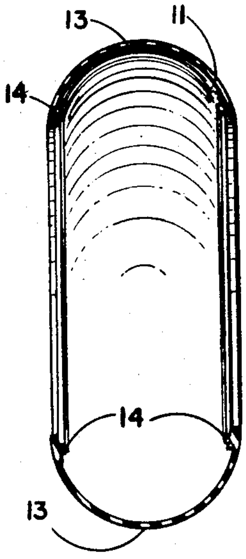
FIG. 3 is a cross-sectional view of a portion of the embodiment shown in FIG. 1 prior to being fitted on the optical disc.

FIGS. 1 through 3 are referred to concurrently. Referring now to FIG. 1, there is shown a side view of one embodiment of this invention. This side view shows optical-transfer band 11 fitted on optical disc 10. Optical disc 10 may be any suitable optically transparent material having a high refractive index such as, but not limited to, polystyrene, acrylic, polyester or similar materials.

Optical-transfer band 11 is made of optically opaque material (not necessarily black) having good resilient and elastic properties, such as polyurethane or neoprene.

Transfer band 11 has a raised center section 13 extending throughout the outer surface of its periphery. Transfer band 11 also has protrusions 14 extending throughout the inner surface of its periphery as depicted in FIG. 2. Protrusions 14 mate with grooves 12 of the optical disc 10 as best seen in FIG. 2.

FIG. 3 is a cross-sectional view of optical-transfer band 11 in its free shape. It is clear that the edges of band 11 have a free diameter which is less than the diameter of the optical disc 10. The diameter of the center section 13 of the transfer band 11 exceeds the diameter of the optical disc 10. As a result, when the optical-transfer band 11 is fitted onto optical disc 10, (see FIG. 2) edge portions and protrusions 14 of band 11 are stretched and grip the disc 10 tightly. In particular, protrusions 14 mate with grooves 12 and form a seal between band 11 and disc 10. However, the raised center portion 13 of band 11 substantially retains the arcuate shape thereof and maintains a space 15 between the transfer band 11 and the peripheral surface of optical disc 10 as best depicted in FIG. 2. The tight grip of protrusions 14 provides a positive seal against foreign matter entering the space 15, which must be maintained optically clean.

Figure 4:
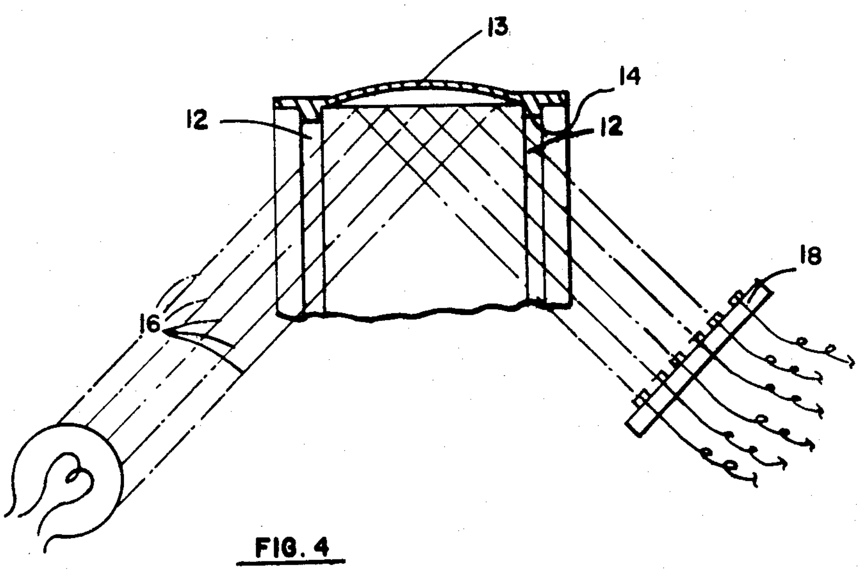
FIG. 4 is a cross-sectional view of a portion of the embodiment shown in FIG. 1 in the non-reading portion.

Referring to FIG. 4, a cross-sectional view through the optical disc 10 with the transfer band 11 in the non-reading position is shown. Light rays 16, emitted from a suitable light source 17, enter one side of optical disc 10 at an angle of incidence with respect to its annular peripheral surface. The angle of incidence is specified to be greater than the critical angle for the total internal reflection. Hence, rays 16 are totally reflected from the internal surface of the periphery of disc 10. The rays then leave the oposite side of optical disc 10. The reflected rays are focused by a suitable optical system on a suitable photodetector device 18.

Figure 5:
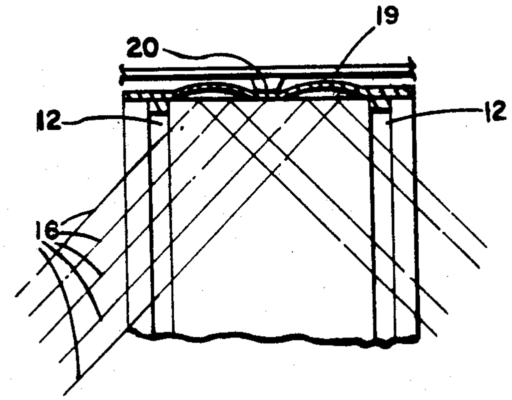
FIG. 5 is a cross-sectional view of a portion of the embodiment shown in FIG. 1 in the reading portion.

FIG. 5 is also a cross-sectional view through the optical disc 10 similar to the showing of FIG. 4 except with transfer band 11 in the reading position. A suitable record medium 19 (for example a credit card or the like) with raised or embossed character 20 thereon is shown. Character 20 is impressed upon the center portion 13 of the transfer band 11. Character 20 forces the transfer band 11 into contact with the annular surface of the optical disc 10.

The reflection of some of the rays from source 17 is therefore selectively frustrated by the optical contact of band 11 with the external surface of disc 10 in a pattern determined by the raised pattern of the embossed character 20. All light rays that are not totally internally reflected are either absorbed or scattered. The image of the embossed character 20 is focused by the optical system onto the photodetector device 18 to provide an output electrical signal representative of the image.

When the recording medium with embossed character 20 thereon advances past the reading position on the optical disc 10, transfer band section 13 immediately springs back to its normal non-reading position as shown in FIG. 4.

Uniform pressure from a flat recording medium (non-embossed) on the transfer band 11 will not frustrate the total internal reflection of rays 16 because the sections of the transfer band 11 adjacent to protrusions 14 are measurably thicker than the center portion 13 of the transfer band 11. Therefore, space 15 (i.e. no optical contact is maintained between band section 13 and the annular surface of disc 10.

Thus, there is shown and described an improved optical-transfer band that can be utilized in a system for reading embossed characters on a suitable recording medium.

The present invention teaches an improved optical-transfer band for use in systems for reading embossed characters such as the system described in Beall. This invention, unlike Beall, does not require the guide roller or tension supports to prevent the optical-transfer band from sticking to the disc surface after it has been pressed against the recording medium.

Another improvement and distinguishing feature from that taught in Beall is that this optical-transfer band has protrusions in the optical-transfer band which engage matching grooves in the optical disc so as to positively maintain proper spacing between the disc and the optical-transfer band when no recording medium is impressed on the disc assembly and to accurately maintain the transfer band positions on the optical disc.

In this invention, the optical transfer band maintains a continuous, positive seal with the optical disc. This seal excludes foreign matter from the space whether the transfer band is in the reading or non-reading position.

The embodiment shown and described is illustrative only. It is not meant to be limitative of the invention, rather the scope of the invention is to be defined by the claims appended hereto.

What is claimed is:

1. An optical-transfer band associated with a system for reading characters including an optical disc, comprising:

a continuous loop of resilient material, said loop describing an arcuate cross-section configuration and having a raised center section, said loop having a minimum diameter which is less than the outside diameter of the optical disc, and at least one protrusion extending from an edge of the inner surface of said continuous loop.

2. An optical-transfer band as recited in claim 1, wherein said loop is composed of optically opaque material, and said loop is fitted over the periphery of the optical disc and each protrusion from said loop engages a groove in the periphery of said disc, and the edges of said loop grip said optical disc tightly to form a seal between said loop and said optical disc.

3. An optical-transfer band as recited in claim wherein the raised center section of said loop defines a space between said loop and said optical disc whereby the optical characteristics of said optical disc are unaffected.

4. An optical-transfer band as recited in claim 3 wherein said raised center section of said loop selectively contacts the optical disc to alter the optical characteristics of said optical disc and resiliently returns to the original position thereof which defines a space between said loop and said optical disc.

* * * * *

PO-1050
(5/69)

UNITED STATES PATENT OFFICE
CERTIFICATE OF CORRECTION

Patent No. 3,762,800 Dated October 2, 1973

Inventor(s) Gust A. Olson et al

It is certified that error appears in the above-identified patent and that said Letters Patent are hereby corrected as shown below:

In the Abstract, line 4, change "excluse" to --exclude--.

Signed and sealed this 29th day of January 1974.

(SEAL)
Attest:

EDWARD M.FLETCHER,JR.
Attesting Officer

RENE D. TEGTMEYER
Acting Commissioner of Patents